United States Patent Office 2,947,703
Patented Aug. 2, 1960

2,947,703

PROCESS OF INHIBITING CORROSION OF FERROUS METALS IN CONTACT WITH AQUEOUS SOLUTIONS OF ACIDS

Louis C. Larsonneur, Chicago, Ill., assignor to Nalco Chemical Company, a corporation of Delaware No Drawing. Filed July 16, 1958, Ser. No. 748,818

4 Claims. (Cl. 252—149)

The present invention relates to compositions useful in preventing the corrosion of ferrous metals in contact with aqueous solutions of sulfamic acid and certain specific hydroxy substituted carboxylic acids. More specifically, it relates to aqueous acid cleaning baths of sulfamic acid which have been treated with minor yet effective amounts of corrosion inhibiting compositions, whereby such baths are rendered substantially noncorrosive to ferrous metals.

An important industrial use of sulfamic acid is its use in the cleaning of various metal surfaces to remove inorganic scales such as calcium carbonate, silicates, alkaline earth metal sulfates, and the like. In the past, it has been common practice to use strong mineral acids such as hydrochloric acid to clean industrial process equipment. The high cost of such cleaning treatments, due to the necessity of special handling, special equipment, and very often the necessity of employing special technologists for this purpose, has made their use undesirable. It has been found expeditious by numerous plant operators to use aqueous solutions of sulfamic acid, which, due to the inherent characteristics of the material, make it possible for relatively unskilled help to safely and efficiently remove dirt, scale, and other contaminants affecting the usefulness of various types of metal equipment.

Thus, sulfamic acid is used to clean such equipment as air conditioning units; sea water evaporators; dairy equipment; industrial boilers, condensers and heat exchangers; food processing and brewery equipment; sugar evaporators, and various pieces of equipment commonly used in paper making.

The most common use for sulfamic acid cleaning preparations resides in their use to remove calcium carbonate scale from industrial boilers, condensers, and heat exchangers. The scales most commonly found in this type of equipment are calcium carbonate, and calcium phosphate, which are readily removed by contacting the scale for a sufficient period of time with aqueous solutions of sulfamic acid which are elevated to temperatures between about 100° and 210° F. The concentrations of these solutions may be varied to suit the particular problem to be solved, but most generally they will contain from 2% to 5% by weight of sulfamic acid, although solutions containing from 0.1% to 15% are sometimes used.

In addition to using sulfamic acid for acid cleaning operations of the type described above, it has also become quite popular to use hydroxy substituted carboxylic acids, either alone or in combination with sulfamic acid, to provide cleaning and scale removal which is oftentimes far superior to either the use of the sulfamic acid or the hydroxy substituted carboxylic acids alone. The particular hydroxy substituted carboxylic acids which have been employed in commercial cleaning operations are usually those acids which contain no more than six carbon atoms in chain length. A preferred class of hydroxy substituted carboxylic acids are the hydroxy substituted polycarboxylic acids, particularly citric acid.

Although sulfamic acid and the hydroxy substituted carboxylic acids are achieving a large measure of success in their ability to clean industrial process equipment, it was found that the solutions of these acids, particularly when maintained in contact with ferrous metal equipment, tended to be extremely corrosive. Early attempts were made to devise suitable corrosion inhibitors for these acids but, for the most part, they were relatively unsuccessful. The most logical inhibitors that were tried to prevent this type of corrosion were those of the type commonly used to inhibit hydrochloric acid when it is used in cleaning operations. Thus, the various pyridines and their salts and derivatives were used with sulfamic acid and the hydroxy substituted carboxylic acids, but by and large they were not particularly effective. It became obvious that a good corrosion inhibitor for sulfamic acid and the hydroxy substituted carboxylic acids would be a worthwhile contribution to the art. This invention is directed to such inhibitors and their use in inhibiting the corrosive effect of solutions of sulfamic acid and/or blends of sulfamic acid with hydroxy substituted carboxylic acids. It, therefore, becomes an object of the invention to provide corrosion inhibiting compositions for aqueous solutions of sulfamic acid and hydroxy substituted carboxylic acids which are effective in preventing the corrosion of ferrous metals in contact with such solutions.

Another object comprises the use of corrosion inhibitors in conjunction with sulfamic acid and/or hydroxy substituted polycarboxylic acids whereby the corrosive tendencies of these materials when dissolved in hot aqueous liquids is materially reduced or completely mitigated. Other objects will appear hereinafter.

In accordance with the invention, it has been found that the corrosive tendencies of aqueous solutions of acids such as sulfamic and hydroxy substituted carboxylic acids when in contact with ferrous metal surfaces may be substantially reduced or mitigated by employing as an inhibitor, a blend of two chemicals which effectively act to retard such corrosion.

The first component of the inhibitor may be broadly described as being a higher alkyl substituted organic nitrogen base, which may be subdivided into four basic groups, viz.:

(1) Higher alkyl substituted monoamines.
(2) Higher alkyl substituted acyclic quaternary ammonium compounds.
(3) Higher alkyl substituted imidazolines.
(4) Higher alkyl substituted imidazolinium salts.

The one basic requirement for the above compounds is that they all must contain at least one higher alkyl substituent, which should be an aliphatic group of from six to twenty-two carbon atoms in chain length.

The second ingredient which composes the inhibitors of the invention may be broadly described as a thiourea compound which is intended to include thiourea, as well as the N-lower alkyl substituted thioureas and the N,N'-lower alkyl substituted thioureas. In the case of the alkyl substituted thioureas, it is preferred that no substituent be in excess of four carbon atoms in chain length.

As will be demonstrated later, the weight ratio of the higher alkyl substituted organic nitrogen base to the thiourea compound may be varied within broad ranges with good results being obtained in all cases. The ratio of higher alkyl substituted organic nitrogen base to thiourea may be within the range of 1:9 to 22:1, calculated on a weight basis. In the preferred form, from the standpoint of formulating the inhibitors of the invention with dry acid cleaning materials, the weight ratio of higher alkyl substituted organic nitrogen base to thiourea compound is preferably at about 1:4.

In order to more fully visualize the ingredients of the invention and the varying amounts that may be formulated to produce useful products, the following general formula is presented:

GENERAL FORMULA

| Ingredients | Percent by Weight | | |
| --- | --- | --- | --- |
| | General Range | Preferred Range | Most Preferred Range |
| Higher alkyl substituted organic nitrogen base | 10-95.6 | 15-90 | 20 |
| Thiourea compound | 4.4-90 | 10-85 | 80 |

The above ranges are set forth for purposes of illustrating the general types of combinations that may be used. All of the above formulas can be used with good results being obtained in all cases.

The amount of the inhibitors necessary to obtain optimum results will vary depending upon environmental circumstances. The two most critical factors in determining the amount of inhibitor necessary to do an adequate job in protecting ferrous metals resides in the concentration of the sulfamic acid or the hydroxy substituted carboxylic acid present in the aqueous cleaning solutions. It is also dependent upon the temperature at which the solution is maintained.

As previously indicated, the temperatures of the acid cleaning solutions are quite often found to be in excess of 100° F. and may be as high as 210° F. The concentration of the acids may, of course, be varied from between 0.1% and 15% by weight. As would be expected, a larger quantity of inhibitor will be necessary where the concentration of the acid employed is relatively high and the temperature is elevated, with the converse also being true, that where lower temperatures and more dilute solutions of acid are employed, the concentration of the inhibitor may be proportionately reduced.

Although only a theory, it is believed the inhibitors are film-forming in nature, and hence relatively small amounts based on the weight of the acid solution may be used. For example, amounts as little as 0.003% by weight have been used with good results, although under severe conditions it may be necessary to employ as much as 1% by weight. As a general rule, however, amounts ranging from 0.001% by 1% by weight provide concentrations of inhibitors in the cleaning solution that will handle nearly all situations. Where typical solutions of sulfamic and/or hydroxy substituted carboxylic acids are used at concentrations ranging from 2% to 5% by weight, it is possible to obtain the maximum corrosion protection using amounts of inhibitor based on the weight of the solution ranging from 0.01% to 0.1% by weight.

When formulating the dry acids with the inhibitors, the amount of the inhibitor in relation to the acid is most conveniently 1% to 3% by weight of the acid, although amounts ranging from 0.01% to 5% by weight can be employed.

Particularly useful acid cleaning compositions are afforded by blending sulfamic acid with certain hydroxy substituted carboxylic acids to produce materials which exhibit scale removal properties, far superior to either of the ingredients used alone. When sulfamic acid is combined with the hydroxy substituted carboxylic acids in weight ratios varying from 2:1 to 1:2, outstanding cleaning formulations are produced. Such blended acid cleaners may also contain pH buffers, such as boric acid and indicator dyes to indicate exhaustion of the cleaning solution. Inhibitors of the invention are designed specifically for this type of combination cleaner, as well as for the individual hydroxy substituted carboxylic acids and sulfamic acid alone.

The hydroxy substituted carboxylic acids contemplated as being subject matter of the inhibited cleaning formulations of this invention are those hydroxy substituted carboxylic acids which contain not more than six carbon atoms in chain length. Illustrative acids of this type are such acids as tartronic acid, malic acid, citramalic acid, tartaric acid, and trihydroxy glutonic acid, all of which are hydroxy substituted dibasic acids. The hydroxy substituted monocarboxylic acids which have been employed with good results are glycolic acid, lactic acid, and alpha-hydroxy butyric acid. The most preferred hydroxy substituted carboxylic acids are the hydroxy substituted polycarboxylic acids which is exemplified by the most preferred acid in this class, citric acid. Any of the above acids may be used alone or in combination with each other in varying proportions without departing from the scope of the invention.

The higher alkyl substituted monoamines which are a species of the higher alkyl substituted organic nitrogen bases may be derived from a large number of commercially available products, with the only limitation being that the particular monoamine contain an alkyl substituent of from six to twenty-two carbon atoms in chain length. Exemplary of such compounds are n-dodecyl amine, n-tetradecyl amine, n-hexadecylamine, n-octadecyl amine, di-cocoamine, and di-hydrogenated tallow amine. In the case of the latter two materials, it will be noted that the source of alkyl substituent on the organic nitrogen is derived from a mixed vegetable oil or animal fat. For purposes of convenience, these compounds have been named from the derivative alkyl-containing components. This system of nomenclature, particularly in the case of alkyl substituents derived from naturally occurring products such as fats, oils and the like, is used for purposes of simplification. It is believed that those familiar with the art will readily understand that the alkyl substituent varies in the case of a coconut substituent with the alkyl groups containing from eight to eighteen carbon atoms in chain length. Similarly, in the case of hydrogenated tallow, the alkyl substituent will vary from about twelve to twenty carbon atoms in chain length. In addition to using monoalkyl monoamines per se, other amines such as octyl dimethyl amine, octadecyl methyl benzyl amine, hexyl triethyl amine, and similar type compounds also may be used.

The second group of higher alkyl substituted organic nitrogen bases consists of the higher alkyl substituted acyclic quaternary ammonium compounds of the formula:

Formula I

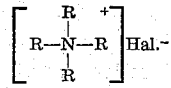

where R may be an alkyl, aryl, alkaryl and/or aralkyl radical, with the proviso that at least one occurrence of R is an aliphatic group of from six to twenty-two carbon atoms in chain length. A typical group of commercially available quaternary ammonium compounds that fall within the above classification and are suited for use in the invention is the "Arquads" manufactured by the Armour Chemical Company. Typical examples of such materials are soya-trimethyl ammonium chloride, dicoco dimethyl ammonium chloride, dihydrogenated tallow dimethyl ammonium chloride, tallow trimethyl ammonium chloride, hexadecyl trimethyl ammonium chloride, octadecyl trimethyl ammonium chloride, and cocotrimethyl ammonium chloride. While these illustrative compounds all contain alkyl groups, it will be understood that other substituents such as benzyl groups, phenyl groups, as well as alkyl groups containing other substituents such as, for instance, halogens, sulfur compounds, oxygen, and the like may be employed with equal facility as long as there is at least one higher alkyl group of the type previously described present in the molecule.

The third species of higher alkyl substituted organic nitrogen base consist of the higher alkyl substituted imidazolines which have the formulas:

Formula II

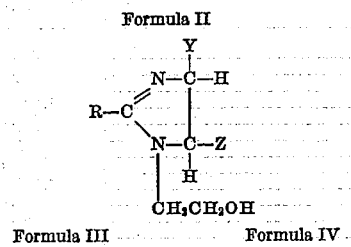

Formula III    Formula IV

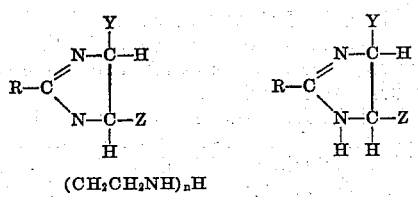

$(CH_2CH_2NH)_nH$ where R is an aliphatic group of from six to twenty-two carbon atoms in chain length, Y and Z are from the group consisting of hydrogen and lower aliphatic hydrocarbon groups of not more than six carbon atoms in chain length and $n$ is an integer of from one to three. Imidazolines of the type shown in Formulas II, III and IV are conveniently prepared by reacting a monocarboxylic acid with an alkylene polyamine or hydroxyalkyl alkylene diamine in accordance with well known methods. The methods of preparing imidazolines of this type are given in the article "The Chemistry of the Two Imidazolines and Imidazolidines," by R. J. Ferm and J. L. Riebsomer, Chemical Reviews, vol. 54, No. 4, August 1954. Particularly useful imidazolines for use in the practice of the invention are those described in Wilson U.S. Patents 2,267,965 and 2,355,837. Two typical imidazolines of the type described by the formulas above are 1-(2-hydroxyethyl)-coco imidazoline and 1-(2-hydroxyethyl)-2-tall oil imidazoline, both of which compounds are conveniently prepared using the teachings of Wilson U.S. 2,267,965.

For purposes of illustrating several other types of typical imidazolines that may be used, the following are given by way of example:

1-(2-hydroxyethyl)-2-undecyl imidazoline
1-(2-hydroxyethyl)-2-tridecyl imidazoline
1-(2-hydroxyethyl)-2-pentadecyl imidazoline
1-(2-hydroxyethyl)-2-heptadecyl imidazoline
1-(2-aminoethyl)-2-heptadecyl imidazoline
1-[(2-aminoethyl)-aminoethyl]-2-undecyl imidazoline
1-[(2-aminoethyl)-aminoethyl]-2-tridecyl imidazoline The last species of higher alkyl substituted organic nitrogen bases are the higher alkyl substituted imidazolinium salts which may be described by the formula:

Formula V

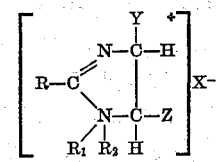

where R above is an aliphatic hydrocarbon of from six to twenty-two carbon atoms in chain length; $R_1$ is a radical from the group consisting of alicyclic and alkyl groups in which an acyclic carbon atom is attached to the quaternary nitrogen atom; $R_2$ is a radical containing not more than six carbon atoms from the group consisting of hydrocarbon radicals, hydroxy hydrocarbon radicals, and amino hydrocarbon radicals; Y and Z are groups which may be either hydrogen or lower aliphatic hydrocarbon groups of not more than six carbon atoms in chain length, and X is the anion of an acid whose alkali metal salt is water-soluble. This class of imidazolinium salts is well known and they are described at length in the specification of Rydell U.S. Patent 2,738,325, the disclosure of which is incorporated herein by reference. This patent describes numerous imidazolinium salts of the type that may be used in the practice of the invention. While any of the imidazolinium salts described in the Rydell patent may be used in the preparation of the compositions used in the practice of this invention, it was found that the most preferred materials have the general formula:

Formula VI

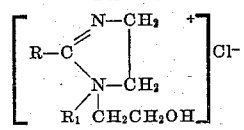

where R is an aliphatic group of from six to eighteen carbon atoms in chain length and $R^1$ is from the group consisting of alicyclic and alkyl groups in which an acyclic carbon atom is attached to the quaternary nitrogen atom. A compound which typifies this specific class of imidazolinium salts is 1-(2-hydroxyethyl)-1-benzyl-2-tall oil imidazolinium chloride. In addition to having a tall oil substituent derived from a tall oil carboxy acid attached to the 2-carbon atom, other various alkyl groups such as undecyl, tridecyl, or groups derived from vegetable oils such as coco and soya oil alkyl radicals may be used with equal effectiveness.

The thiourea compound useful in the invention may be selected from numerous commercially-available thioureas which are exemplified by such compounds as thiourea, N,N'-diethyl thiourea, allyl thiourea, N,N'-dibutyl thiourea, and methyl thiourea. Of all the thiourea compounds that may be employed, it is preferred to use the parent compound, thiourea, since it is the most economical choice.

Typical combinations of higher alkyl substituted organic nitrogen bases and thiourea compounds are presented for purposes of illustration in Table I. Also

TABLE I

| Ingredient | I | II | III | IV | V | VI | VII | VIII | IX | X | XI | XII | XIII | XIV | XV | XVI |
|---|---|---|---|---|---|---|---|---|---|---|---|---|---|---|---|---|
| 1. Thiourea | 7.7 | 10 | 14.3 | 25 | 81.6 | 86.9 | 100 | | | | | | 14.3 | 14.3 | 14.3 | 14.3 |
| 2. Imidazolinium Salt | 92.3 | 90 | 85.7 | 75 | 18.4 | 13.1 | | 100 | | | | | 85.7 | | | |
| 3. Imidazalin A | | | | | | | | | 100 | | | | | 85.7 | | |
| 4. Imidazalin B | | | | | | | | | | 100 | | | | | 85.7 | |
| 5. Quaternary Ammonium Compound A | | | | | | | | | | | 100 | | | | | |
| 6. Quaternary Ammonium Compound B | | | | | | | | | | | | 100 | | | | 85.7 |

1. Thiourea.
2. Imidazolinium Salt=1-(2-hydroxyethyl)-1-benzyl-tall oil imidazolinium chloride.
3. Imidazoline A=1-(2-hydroxyethyl)-2-coco imidazoline.
4. Imidazoline B=1-(2-hydroxyethyl)-2-tall oil imidazoline.
5. Quaternary ammonium compound A=tallow-trimethyl ammonium chloride.
6. Quaternary ammonium compound B=dodecyl-trimethyl ammonium chloride.

shown are all the individual components of the formula which are listed for purposes of comparison. The quantities are given in parts by weight.

EVALUATION OF THE INVENTION

Example I

Static acid corrosion tests were run using sand blasted, weighted, mild steel coupons. Coupons were hung by means of glass hooks in 200 cc. of a 3% by weight solution of sulfamic acid in Chicago tap water, with the inhibitor added in terms of percent by weight. A four-hour test period at 160° F. was selected for the test since it was representative of typical industrial conditions of use. At the end of the test, the coupons were visually evaluated, weight losses were measured, and corrosion rates were calculated in terms of mils per year (m.p.y.). The percent protection was calculated based on blank and mil-per-year results. The various compositions tested are presented in Table I, with the results of the test presented in Table II.

TABLE II

| Composition Number | Percent by Weight in Solution | M.p.y. | Percent Protection |
|---|---|---|---|
| I | 0.0406 | 34.7 | 98.3 |
| I | 0.0812 | 25.1 | 98.8 |
| II | 0.037 | 34.0 | 98.3 |
| II | 0.074 | 25.4 | 98.7 |
| III | 0.0636 | 31.6 | 98.4 |
| III | 0.0318 | 45.8 | 97.3 |
| III | 0.0159 | 56.1 | 97.2 |
| III | 0.0080 | 63.2 | 96.9 |
| III | 0.0040 | 89.7 | 95.6 |
| IV | 0.0235 | 42.1 | 97.9 |
| IV | 0.0470 | 24.7 | 98.8 |
| V | 0.0825 | 48.1 | 97.6 |
| VI | 0.075 | 69.0 | 96.4 |
| VII | 0.05 | 818.5 | 59.5 |
| VII | 0.1 | 636.0 | 68.5 |
| VIII | 0.03 | 409.0 | 79.8 |
| VIII | 0.06 | 379.0 | 81.2 |
| IX | 0.1 | 517.0 | 74.4 |
| X | 0.1 | 519.0 | 74.4 |
| XI | 0.05 | 482 | 76.2 |
| XI | 0.10 | 355 | 82.5 |
| XII | 0.05 | 479 | 76.3 |
| XII | 0.10 | 202 | 90.0 |
| XIII | 0.1 | 75.3 | 96.3 |
| XIV | 0.1 | 70.9 | 96.5 |
| XV | 0.0546 | 186.5 | 90.8 |
| XV | 0.0273 | 192.5 | 90.5 |
| XVI | 0.0546 | 64.4 | 96.8 |
| XVI | 0.0273 | 74.6 | 96.7 |

Example II

Using the same test method as set forth in Example I, other typical formulas as well as their individual components and other known inhibitors were also tested. These materials are listed in Table III with their effectiveness as inhibitors being shown in Table IV. The temperature of the test solution in this series was 175° F.

TABLE IV

| Composition Number | Corrosion Rate (in m.p.y.) | Percent Protection |
|---|---|---|
| XVII | 334.3 | 88.5 |
| XVIII | 420.4 | 85.9 |
| XIX | 117.6 | 96.1 |
| XX | 1,806.2 | 39.6 |
| XXI | 768.9 | 74.2 |
| XXII | 761.3 | 74.5 |
| XXIII | 72.8 | 97.8 |
| XXIV | 68.1 | 97.1 |
| XXV | 1,263.9 | 58.6 |
| XXVI | 69.0 | 97.7 |
| XXVII | 81.8 | 97.3 |
| XXVIII | 44.7 | 98.5 |
| XXIX | 44.7 | 98.5 |

Tables II and IV show that neither the higher alkyl substituted organic nitrogen base nor the thiourea compound when tested alone is as effective as the combinations of these two ingredients.

Several of the formulas shown were tested as to their cleaning efficiency insofar as scale removal was concerned, both without inhibitor and with inhibitor; and it was found that the inhibitor even when used in concentrations as great as 3% by weight based on the amount of solid acid present, did not interfere with the cleaning efficiency of the formulations, while still enabling cleaning operations to be conducted without severe amounts of corrosion taking place.

The formulas of the invention, are soluble in water at use concentrations. Many of these formulas may be made up into relatively concentrated solutions for purposes of convenience in shipping and handling. The most usable form of the invention, however, resides in physically blending or admixing the inhibitors directly with the dry acid products, whereby unitary, solid, water-soluble materials may be afforded. When solid formulations of this type are desired, it is convenient to choose a blend of higher alkyl substituted organic nitrogen base and thiourea compound whereby the resultant product is a solid mass and is readily admixed with the solid acid materials. Since the solid formulation with the dry acids is a desirable feature of the invention, it is preferred to employ the alkyl substituted organic nitrogen base and thiourea composition in a weight ratio of 1:4, which provides a solid product which is easily mixed with the dry acid cleaners producing a unitary, dry solid product having no disadvantages from the standpoint of handling or appearance.

The invention is hereby claimed as follows:

1. A process of inhibiting corrosion of ferrous metals in contact with aqueous solutions of acids, said acids being from the group consisting of sulfamic acid and hydroxy substituted carboxylic acids which contain no more than 6 carbon atoms in chain length and mixtures of said acids,

TABLE III

| Composition No. | Sulfamic Acid | Imidazolinium Salt [1] | Allyl Thiourea | Duomeen C [2] | Thiourea | Imidazolinium Salt [3] | Methyl violet | Citric Acid | Boric Acid |
|---|---|---|---|---|---|---|---|---|---|
|  | Percent by Wt. | Percent by Wt. | Percent by Wt. | Percent by Wt. | Percent by Wt. | Percent by Wt. | Percent by Wt. | Percent by Wt. | Percent by Wt. |
| XVII | 97 | 3 |  |  |  |  |  |  |  |
| XVIII | 98 | 2 |  |  |  |  |  |  |  |
| XIX | 97 |  | 3 |  |  |  |  |  |  |
| XX | 97 |  |  | 3 |  |  |  |  |  |
| XXI | 97 |  |  |  | 3 |  |  |  |  |
| XXII | 98 |  |  |  | 2 |  |  |  |  |
| XXIII | 97 |  |  |  | 2 | 1 |  |  |  |
| XXIV | 98 |  |  |  | 1 | 1 |  |  |  |
| XXV | 99 |  |  |  |  | 1 |  |  |  |
| XXVI | 97.5 |  |  |  | 2 | .5 |  |  |  |
| XXVII | 98.5 |  |  |  | 1 | .5 |  |  |  |
| XXVIII | 97.2 |  |  |  | 2 | .75 | .05 |  |  |
| XXIX | 62.2 |  |  |  | 2 | .75 | .05 | 15 | 20 |

[1] 1-(2-hydroxyethyl)-1-benzyl-2-hydrogenated tallow imidazolinium chloride.
[2] N-coco 1,3-trimethylene diamine.
[3] 1-(2-hydroxyethyl)-1-benzyl-2-tall oil imidazolinium chloride.

which comprises adding to such solutions corrosion inhibiting amounts of a corrosion inhibiting composition which comprises (A) a higher alkyl substituted organic nitrogen base from the group consisting of higher alkyl substituted monoamines, higher alkyl substituted acyclic quaternary ammonium compounds, higher alkyl substituted imidazolines and higher alkyl substituted imidazolinium salts, said higher alkyl substituted organic nitrogen base containing at least one aliphatic group of from 6 to 22 carbon atoms in chain length and (B) a thiourea from the group consisting of thiourea, N-lower alkyl substituted thioureas, and N,N'-lower alkyl substituted thioureas, and alkyl substituted thioureas having no substituent greater than 4 carbon atoms in chain length with the weight ratio of A to B being within the range of 1:9 to 22:1.

2. A process of inhibiting corrosion of ferrous metals in contact with aqueous solutions of acids, said acids being from the group consisting of sulfamic acid and hydroxy substituted carboxylic acids which contain no more than 6 carbon atoms in chain length and mixtures of said acids, which comprises adding to such solutions corrosion inhibiting amounts of a corrosion inhibiting composition which comprises (A) a higher alkyl substituted monoamine which contains at least one aliphatic group of from 6 to 22 carbon atoms in chain length and (B) a thiourea from the group consisting of thiourea, N-lower alkyl substiuted thioureas and N,N'-lower alkyl substituted thioureas, said alkyl substituted thioureas having no substituent greater than 4 carbon atoms in chain length, with the weight ratio of A to B being within the range of 1:9 to 22:1.

3. A process of inhibiting corrosion of ferrous metals in contact with aqueous solutions of acids, said acids being from the group consisting of sulfamic acid and hydroxy substituted carboxylic acids which contain no more than 6 carbon atoms in chain length and mixtures of said acids, which comprises adding to such solutions corrosion inhibiting amounts of a corrosion inhibiting composition which comprises (A) a higher alkyl substituted acyclic quaternary ammonium compound of the formula:

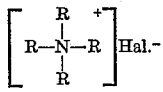

wherein R is from the group consisting of alkyl, aryl, aralkyl, and alkaryl with the proviso that at least one occurrence of R is an aliphatic group of from 6 to 22 carbon atoms in chain length and (B) a thiourea from the group consisting of thiourea, N-lower alkyl substituted thioureas and N,N'-lower alkyl substituted thioureas having no substituent greater than 4 carbon atoms in chain length with the weight ratio of A to B being within the range of 1:9 to 22:1.

4. A process of inhibiting corrosion of ferrous metals in contact with aqueous solutions of acids, said acids being from the group consisting of sulfamic acid and hydroxy substituted carboxylic acids which contain no more than 6 carbon atoms in chain length and mixtures of said acids, which comprises adding to such solutions corrosion inhibiting amounts of a corrosion inhibiting composition which comprises (A) a higher alkyl substituted imidazoline from the group consisting of:

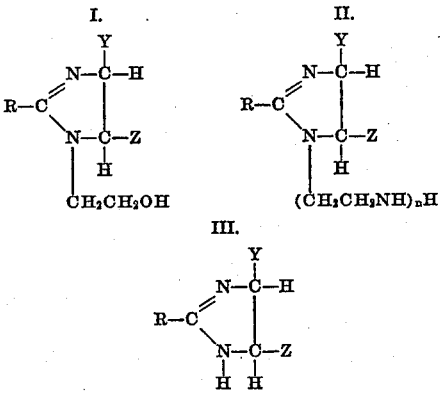

where R is an aliphatic group of from 6 to 22 carbon atoms in chain length, Y and Z are from the group consisting of hydrogen and lower aliphatic hydrocarbon groups of not more than 6 carbon atoms in chain length and $n$ is an integer of from 1 to 3, and (B) a thiourea from the group consisting of thiourea, N-lower alkyl substituted thioureas and N,N'-lower alkyl substituted thioureas having no substituent greater than 4 carbon atoms in chain length, with the weight ratio of A to B being within the range of 1:9 to 22:1.

References Cited in the file of this patent
UNITED STATES PATENTS

| | | |
|---|---|---|
| 1,523,741 | Yonkman | Jan. 20, 1925 |
| 1,608,622 | Schmidt et al. | Nov. 30, 1926 |
| 1,734,949 | Vignos | Nov. 5, 1929 |
| 1,996,730 | Thomas et al. | Apr. 2, 1935 |
| 2,006,216 | MacArthur et al. | June 25, 1935 |
| 2,225,294 | Bolton et al. | Dec. 17, 1940 |
| 2,318,559 | Percival | May 4, 1943 |
| 2,424,049 | Parker et al. | July 15, 1947 |
| 2,510,063 | Bried | June 6, 1950 |
| 2,606,155 | Hill | Aug. 5, 1952 |
| 2,628,199 | Lowenheim | Feb. 10, 1953 |
| 2,739,980 | Chester | Mar. 27, 1956 |
| 2,781,351 | Mannheimer | Feb. 12, 1957 |

FOREIGN PATENTS

| | | |
|---|---|---|
| 538,092 | Canada | Mar. 12, 1957 |
| 774,521 | Great Britain | May 8, 1957 |